United States Patent
Broadus

(10) Patent No.: US 10,015,956 B2
(45) Date of Patent: Jul. 10, 2018

(54) HORSESHOE WITH CLIPS, BLISTER MEMBER FOR A CLIP, AND METHOD OF APPLYING SHOE TO A HORSE'S HOOF

(71) Applicant: William P. Broadus, Shelbyville, KY (US)

(72) Inventor: William P. Broadus, Shelbyville, KY (US)

(73) Assignee: Broadline Farrier Solutions, LLC, Shelbyville, KY (US)

( * ) Notice: Subject to any disclaimer, the term of this patent is extended or adjusted under 35 U.S.C. 154(b) by 258 days.

(21) Appl. No.: 14/962,150

(22) Filed: Dec. 8, 2015

(65) Prior Publication Data
US 2016/0157474 A1     Jun. 9, 2016

Related U.S. Application Data

(60) Provisional application No. 62/088,887, filed on Dec. 8, 2014.

(51) Int. Cl.
*A01L 3/00* (2006.01)
*A01L 7/00* (2006.01)

(52) U.S. Cl.
CPC .. *A01L 3/00* (2013.01); *A01L 7/00* (2013.01)

(58) Field of Classification Search
CPC ..... A01L 3/00; A01L 3/02; A01L 5/00; A01L 1/00; A01L 1/02; A01L 1/04; A01L 7/00
See application file for complete search history.

(56) References Cited

U.S. PATENT DOCUMENTS

| | | | | |
|---|---|---|---|---|
| 209,575 A | * | 11/1878 | McKinney | A01L 1/00 168/25 |
| 246,545 A | * | 8/1881 | O'Neil | A01L 7/00 168/43 |
| 340,440 A | * | 4/1886 | Hayes | A01L 3/00 144/250.21 |
| 487,177 A | * | 11/1892 | Crannell | A01L 3/00 168/22 |
| 492,460 A | * | 2/1893 | Crannell | A01L 3/00 168/17 |
| D27,644 S | | 9/1897 | Cooper et al. | |

(Continued)

FOREIGN PATENT DOCUMENTS

| | | | | |
|---|---|---|---|---|
| DE | 3424726 A1 | * | 2/1986 | A01L 3/00 |
| EP | 233335 A2 | * | 11/1986 | A01L 3/00 |

(Continued)

OTHER PUBLICATIONS

"Hanton Horsehoes". Found online Jun. 7, 2016 at facebook.com. Page dated Sep. 3, 2014. Retrieved from https://.m.facebook.com/story.php?story_fbid=612536902192619&id=612486635530979.

(Continued)

*Primary Examiner* — Son T Nguyen
(74) *Attorney, Agent, or Firm* — James C. Eaves, Jr.; Brian W. Chellgren; Bingham Greenebaum Doll LLP

(57) ABSTRACT

A horseshoe with clips, blister member for a clip, and a method of applying a shoe to a horse's hoof. Using a blister member over each of a pair of upward extending clips attached to the outer side of a horseshoe and attaching the blister member to the shoe and the horse's hoof, adhesive is inserted into the blister to adhere each clip to the hoof wall thereby retaining the horseshoe on a horse's hoof.

12 Claims, 17 Drawing Sheets

(56) References Cited

U.S. PATENT DOCUMENTS

| | | | | |
|---|---|---|---|---|
| 726,643 | A | * | 4/1903 | Colleran ............... A01L 5/00 168/21 |
| 766,443 | A | * | 8/1904 | Haller ................. A01L 7/00 168/20 |
| 976,579 | A | * | 11/1910 | Klein .................. A01L 7/00 168/20 |
| 1,000,951 | A | * | 8/1911 | Sawicki ............... A01L 3/00 168/13 |
| 1,106,351 | A | * | 8/1914 | Balogh et al. ......... A01L 3/00 168/22 |
| 1,113,734 | A | * | 10/1914 | Balajthy .............. A01L 3/00 168/22 |
| 1,169,020 | A | * | 1/1916 | Eaves ................. A01L 3/04 168/19 |
| 1,174,860 | A | * | 3/1916 | Harris ................ A01L 3/00 168/22 |
| 1,184,352 | A | * | 5/1916 | Kilberg et al. ........ A01L 7/00 168/20 |
| 1,273,294 | A | * | 7/1918 | Warminski ............ A01L 3/04 168/19 |
| 1,496,511 | A | * | 6/1924 | Allman ................ A01L 3/00 168/1 |
| 3,302,723 | A | * | 2/1967 | Renkenberger ......... A01L 3/02 168/24 |
| 3,599,720 | A | | 8/1971 | Mathern |
| 3,709,301 | A | * | 1/1973 | Hall .................. A01K 15/02 168/25 |
| 3,894,585 | A | * | 7/1975 | Baum ................. A01L 1/00 168/25 |
| 3,957,120 | A | | 5/1976 | Alletrux |
| 4,090,566 | A | | 5/1978 | Spencer |
| 4,299,288 | A | * | 11/1981 | Peacock .............. A01L 7/04 168/23 |
| D295,907 | S | | 5/1988 | Decker |
| 5,692,569 | A | * | 12/1997 | Constantino .......... A01L 3/00 168/17 |
| 5,740,865 | A | * | 4/1998 | Turk ................. A01L 1/04 168/4 |
| 5,871,054 | A | * | 2/1999 | Bloom ................ A01L 3/00 168/17 |
| 5,924,274 | A | | 7/1999 | Kerckhaert |
| 6,571,881 | B1 | * | 6/2003 | Nolan ................ A01L 7/00 168/12 |
| D486,276 | S | | 2/2004 | Hasegawa |
| D522,188 | S | | 5/2006 | Doolan |
| D632,848 | S | | 2/2011 | Kerckhaert |
| D732,752 | S | | 6/2015 | Osborne |
| 2005/0126793 | A1 | * | 6/2005 | McCuan .............. A01L 3/00 168/17 |
| 2009/0188680 | A1 | * | 7/2009 | Daine ................ A01L 7/00 168/45 |
| 2010/0276163 | A1 | | 11/2010 | Berghorn |
| 2011/0139467 | A1 | | 6/2011 | Moller |
| 2011/0186309 | A1 | | 8/2011 | Hoselton |
| 2012/0261143 | A1 | * | 10/2012 | Craig ................ A01L 3/00 168/17 |
| 2014/0231100 | A1 | * | 8/2014 | Ford ................. A01L 1/02 168/12 |
| 2014/0231101 | A1 | | 8/2014 | Ford |

FOREIGN PATENT DOCUMENTS

| | | | | |
|---|---|---|---|---|
| GB | 1299836 | A | | 12/1972 |
| GB | 1489445 | A | | 10/1977 |
| RU | 2285402 | C2 | | 10/2006 |
| WO | WO-9940782 | A1 | * | 8/1999 ............ A01L 1/00 |

OTHER PUBLICATIONS

"New Hanton Glue-On Horseshoes Will Change the Way You Think About Protecting Horses' Feet." Found online Jun. 7, 2016 at chronofhorse.com. Page dated Nov. 19, 2014. Retrieved from http://www.chronofhorse.com/article/joint-revolution-new-hanton-glue-horseshoes-will-change-way-you-think.

"St Croix Aluminium Front Eventer Clip-Pair". Found online Jun. 6, 2016 at thefarrier.co.nz. Page dated Jan. 13, 2015. Retrieved from http://web.archive.org/web/20150113224147/http://thefarrier.co.nz/products/horseshoes/st-croix-aluminium-front-eventer-clip-pair/.

"Horse Discovery: KY 4-H Horse Program." Found online Jun. 6, 2016 at ca.uky.edu. Page dated Nov. 27, 2013. Retrieved from http://web.archieve.org/web/2013112720544/http://www2.ca.uky.edu/horsediscovery/Horseshoes.html.

PCT/US2015/064418 International Search Report.

* cited by examiner

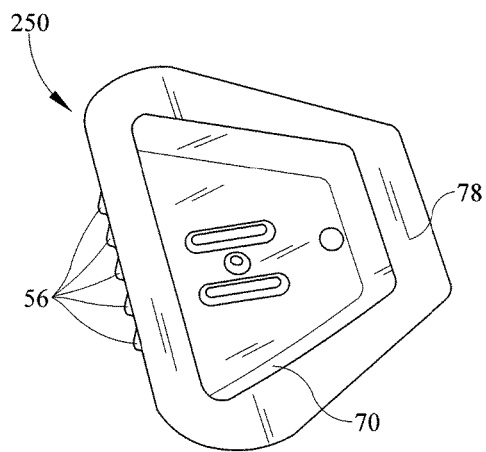
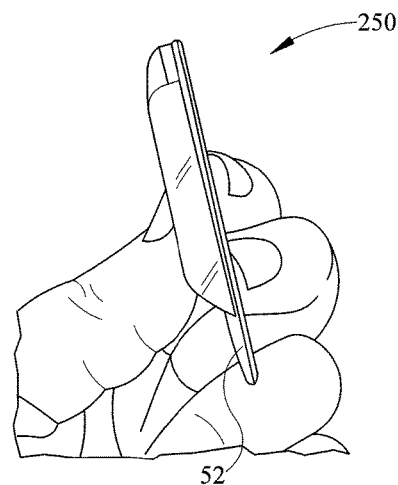
FIG. 12  FIG. 13
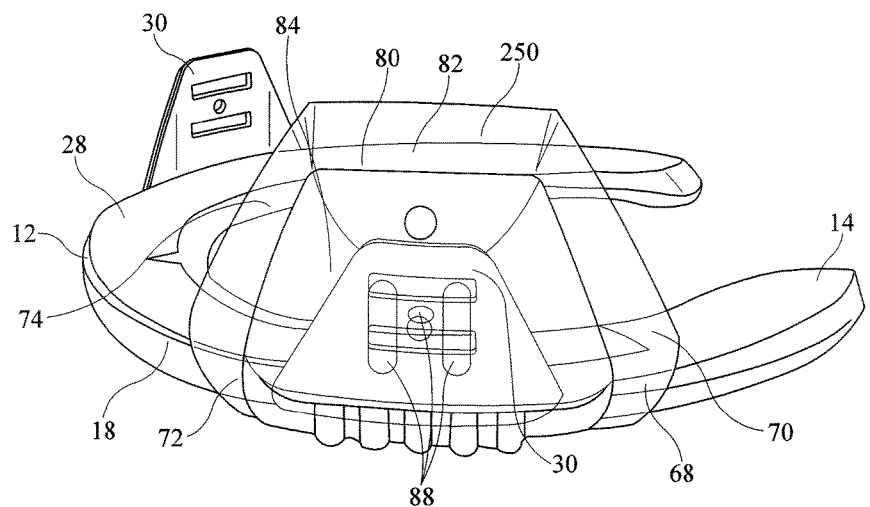
FIG. 14

HORSESHOE WITH CLIPS, BLISTER MEMBER FOR A CLIP, AND METHOD OF APPLYING SHOE TO A HORSE'S HOOF

This application claims the benefit of U.S. provisional patent application Ser. No. 62/088,887, filed Dec. 8, 2014, for HORSESHOE WITH CLIPS, BUBBLE MEMBER FOR A CLIP, AND METHOD OF APPLYING SHOE TO A HORSE'S HOOF, incorporated herein by reference.

BACKGROUND OF THE INVENTION

Field of the Invention

The present invention relates to a horseshoe with clips, blister member for a clip, and a method of applying a shoe to a horse's hoof. Using a blister member over each of a pair of upward extending clips attached to the outer side of a horseshoe and attaching the blister member to the shoe and the horse's hoof, adhesive is inserted into the blister to adhere each clip to the hoof wall, thereby retaining the shoe on the horse's hoof.

SUMMARY OF THE INVENTION

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

The present invention teaches a blister member, a horseshoe with upward extending clips, and a method of adhering the shoe to a horse's hoof. A blister member is attached over each of a pair of upward extending clips, those clips attached to the outer side of a horseshoe, the blister member attached to the shoe and the horse's hoof, adhesive then being inserted into the blister to adhere each clip to the hoof wall, thereby retaining the shoe on the horse's hoof.

In further detail, the present invention is for blister member for use in adhering a horseshoe to a horse's hoof, the blister member having an outer surface and an inner surface; an outer edge with a top outer edge and a bottom outer edge with a pair of side outer edges therebetween; the outer edge having at least one air escape vent; and, a generally trapezoidal shaped perforation line interior of the outer edge, a portion interior of the perforation line raised with respect to a portion exterior of the perforation line; the portion interior of the perforation line having an adhesive receiving opening between the outer surface and the inner surface. One of the at least one air escape vent can be located at the bottom outer edge, or the at least one air escape vent can comprise at least two air escape vents, one of the at least two air escape vents located at the bottom outer edge and another of the at least two air escape vents located at the top outer edge. Even further, the adhesive receiving opening can be located toward the top outer edge with respect to the bottom outer edge. For use in affixing, the inner surface of the blister member along the outer edge can have a two-sided tape attached thereto. Optionally, the blister member can have slits located on the pair of side outer edges toward the top outer edge and bottom outer edge, the slits extending inward toward the perforation line.

Also, in further detail, the present invention is for a horseshoe being a curved shoe having a heel at each end and a toe therebetween, the shoe having a ground surface and a foot surface opposite the ground surface, the shoe having an outer side thereround and an inner side; a first clip and a second clip, both clips having a clip bottom and a clip top, the first clip attached to the shoe along the shoe outer side and the clip bottom, the attachment between the toe and one heel, the clip top oriented upward and away from the ground surface; the second clip attached to the shoe along the shoe outer side and the clip bottom, the attachment between the toe and the other heel, the clip top oriented upward and away from the ground surface; the first clip and the second clip having at least one opening therethrough, the at least one opening being aligned parallel to the shoe ground surface. If desired, the first clip and the second clip can each include a beveled outer edge along the clip top and extending toward the clip bottom or the first clip and the second clip can each have a rolled portion along the clip top. The inventor envisions using the beveled outer edge for shoes and clips made of aluminum and the rolled portion for shoes and clips made of steel.

Even further, in the horseshoe of the present invention, the at least one opening in the first clip and second clip can comprise at least two openings, each of the at least two openings being aligned parallel to the shoe ground surface. This parallel configuration assists the clip collapse if the shoe comes loose from a horse's hoof and the horse steps on it, thereby helping minimize any injury to the hoof.

Even further, with the horseshoe of the instant invention, each of the first clip and second clip have a blister member at least partially thereover, each blister member for use in adhering the horseshoe to a horse's hoof, each blister member having an outer surface and an inner surface; an outer edge with a top outer edge and a bottom outer edge with a pair of side outer edges therebetween; the outer edge having at least one air escape vent; and, a generally trapezoidal shaped perforation line interior of the outer edge, a portion interior of the perforation line raised with respect to a portion exterior of the perforation line; the portion interior of the perforation line having an adhesive receiving opening between the outer surface and the inner surface; the bottom outer edge of each blister member attached along the shoe outer side along the clip bottom and each side thereof, the blister top outer edge extending upward beyond the clip top. Each blister member can have one of its at least one air escape vent located at the bottom outer edge or each blister member can have one of its at least one air escape vent comprising at least two air escape vents, one of the at least two air escape vents located at the bottom outer edge and another of the at least two air escape vents located at the top outer edge. Also, each blister member can have its adhesive receiving opening located toward the top outer edge with respect to the bottom outer edge and/or each blister member can have a two-sided tape attached along the outer edge of the blister member inner surface, the two-sided tape utilized to attach each blister member along the shoe outer side.

Even further, the present invention comprises a method of applying a horseshoe to a horse's hoof, including the steps of: first, taking a horseshoe being a curved shoe having a heel at each end and a toe therebetween, the shoe having a ground surface and a foot surface opposite the ground surface, the shoe having an outer side thereround and an inner side; a first clip and a second clip, both clips having a clip bottom and a clip top, the first clip attached to the shoe along the shoe outer side and the clip bottom, the attachment between the toe and one heel, the clip top oriented upward and away from the ground surface; the second clip attached to the shoe along the shoe outer side and the clip bottom, the attachment between the toe and the other heel, the clip top oriented upward and away from the ground surface; the first clip and the second clip having at least one opening therethrough, the at least one opening being aligned parallel to the shoe ground surface; and placing the foot surface of the horseshoe against the horse's hoof; second, adjusting the first and second clip so that they are flush with a wall of the horse's hoof; third, attaching a first blister member over the first clip and a second blister member over the second clip, each of the first and second blister members having an outer surface and an inner surface; an outer edge with a top outer edge and a bottom outer edge with a pair of side outer edges therebetween; the outer edge having at least one air escape vent; and, a generally trapezoidal shaped perforation line interior of the outer edge, a portion interior of the perforation line raised with respect to a portion exterior of the perforation line and away from the wall of the horse's hoof; the portion interior of the perforation line having an adhesive receiving opening between the outer surface and the inner surface; the bottom outer edge of each blister member attached along the shoe outer side along the clip bottom and each side thereof, the blister top outer edge extending upward beyond the clip top with each blister having its side outer edges and top outer edge attached to the wall of the horse's hoof; and, fourth, inserting adhesive into the adhesive receiving opening of each blister and allowing the inserted adhesive to cure.

Additionally, after the step of inserting adhesive and allowing it to cure, the additional step of removing the portion exterior of the perforation line from the first and second blister members can be included. Also, in the step of taking a horseshoe and placing the foot surface of the horseshoe against the horse's hoof, a two-sided tape can be used between the horseshoe's foot surface and the horse's hoof.

BRIEF DESCRIPTION OF THE DRAWINGS

A better understanding of the present invention will be had upon reference to the following description in conjunction with the accompanying drawings, wherein:

FIG. 12 shows a perspective view of the blister of a third implementation from the blister's hoof engaging back side, the outer border of the blister having two-sided tape and a backer material thereon, the blister shown in FIG. 9 and subsequent figures showing the blister having two parallel line indentations and a dot indention therebetween, those indentions representing applicant's trade dress/trademark and not related to the instant invention;

FIG. 13 shows a side view of the blister of FIG. 12;

FIG. 14 shows a perspective view of the horseshoe of the instant invention showing the foot surface from an outer side of the shoe, a blister adhesively attached to the outer side of the shoe to show the relationship between a clip and a blister;

DETAILED DESCRIPTION OF THE PREFERRED EMBODIMENT

Figure 1:
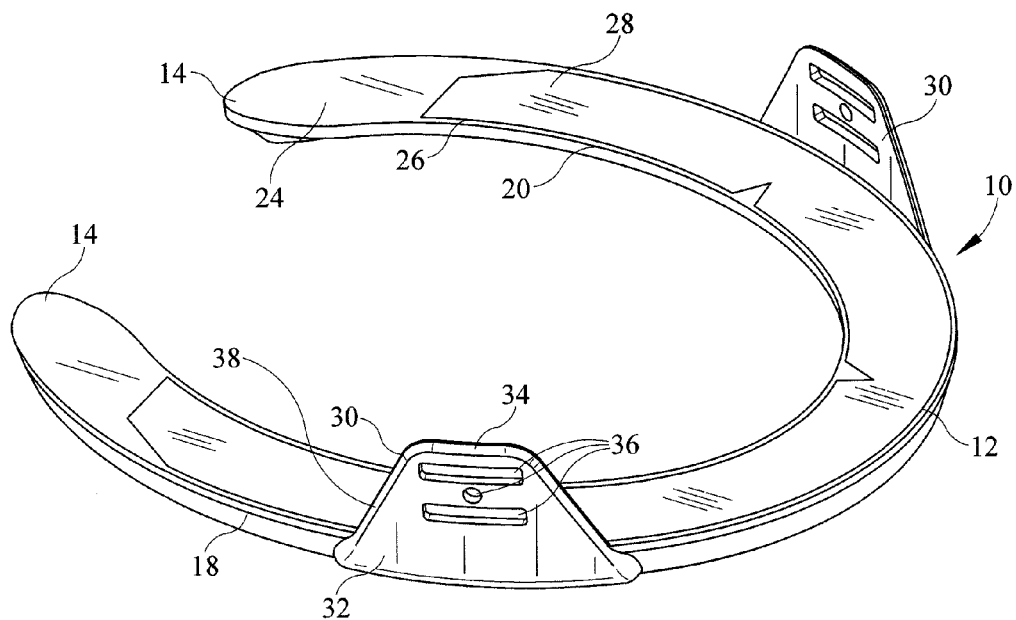
FIG. 1 shows a perspective of the horseshoe of the instant invention from the outer side toward the foot surface of the shoe.
Figure 2:
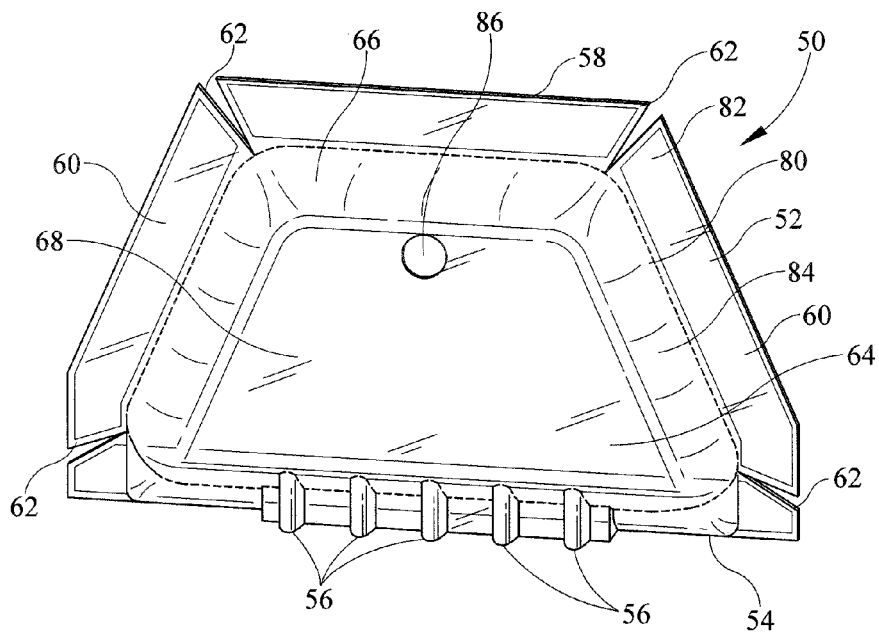
FIG. 2 shows a perspective view of the blister first implementation of the instant invention looking toward its outer surface.
Figure 3:
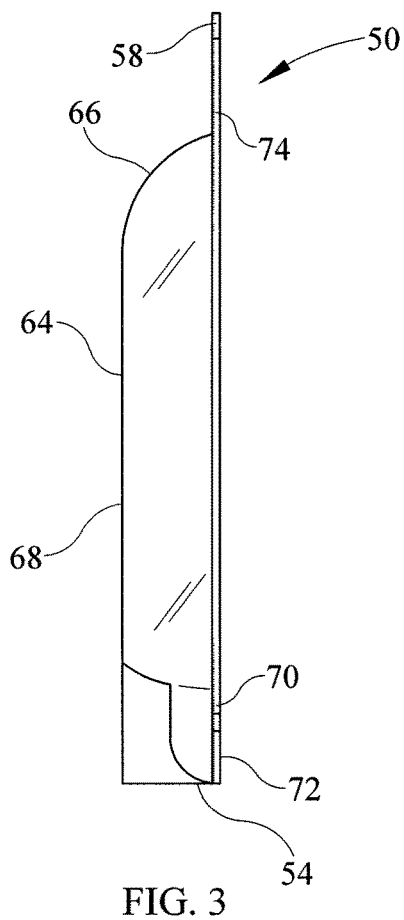
FIG. 3 shows a right side view of the blister of FIG. 2.
Figure 4:
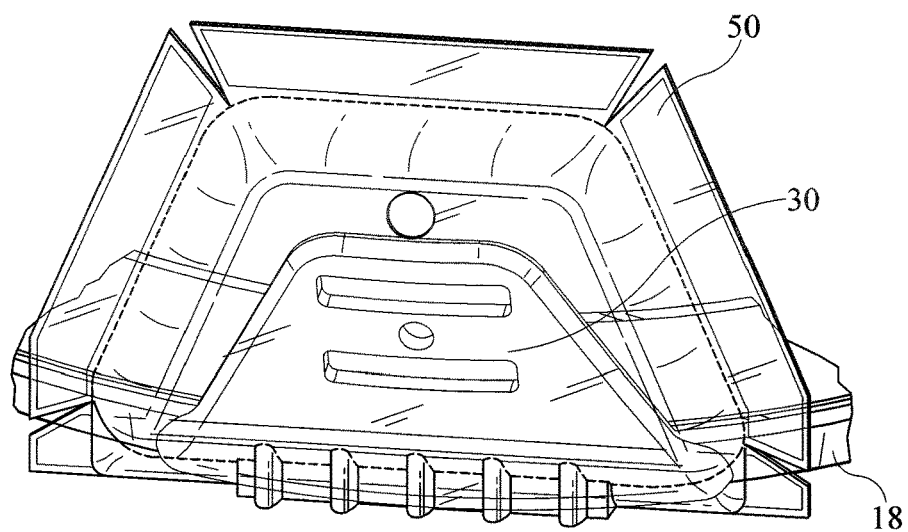
FIG. 4 shows the blister of FIGS. 2 and 3 in preparation of its application to the outer side of the horseshoe of FIG. 1.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Specific quantities (spatial dimensions, angles, dimensionless parameters, etc.) may be used explicitly or implicitly herein, such specific quantities are presented as examples and are approximate values unless otherwise indicated. Discussions pertaining to specific compositions of matter are presented as examples and do not limit the applicability of other compositions of matter, especially other compositions of matter with similar properties, unless otherwise indicated.

With reference to the figures, implementations of the horseshoe with clip and blisters of the instant invention are shown, along with the method of using blisters to adhesively affix the horseshoe of the instant invention to a horse's hoof. For ease of reference, the following reference numerals are used in the various figures: 2—farrier; 3—farrier's tool; 4—adhesive applicator; 5—horse's hoof; 6—bottom of hoof; 7—hoof wall; 10, 100—horseshoe; 12—toe; 14—heel; 16—nail holes; 17—channel to recess nail heads; 18—outer side; 20—inner side; 22—ground surface; 24—foot surface; 26—two-sided tape; 27—notch in two-sided tape; 28—backer for two-sided tape; 30, 130—clip or tab; 32—clip bottom; 34—clip top; 135—rolled clip top; 36, 136—openings through clip; 38—beveled outer edge; 50, 150, 250—blister; 52, 152—outer edge; 54, 154—bottom outer edge; 56—air escape vents; 58, 158—top outer edge; 60, 160—side outer edges; 62—slits; 64—front surface; 66, 166—outward sloping surface; 68, 168—outer surface; 70—inner surface; 72—bottom inner surface to engage shoe; 74—upper inner surface to engage hoof; 76—two-sided tape; 78—backer for two-sided tape; 80—perforation line; 82—portion exterior of perforations; 84—portion interior of perforations; 86—adhesive receiving opening; 88—trade dress/trademark on blister not part of invention; 90—adhesive inside blister; and, 92—wrap.

Figure 37:
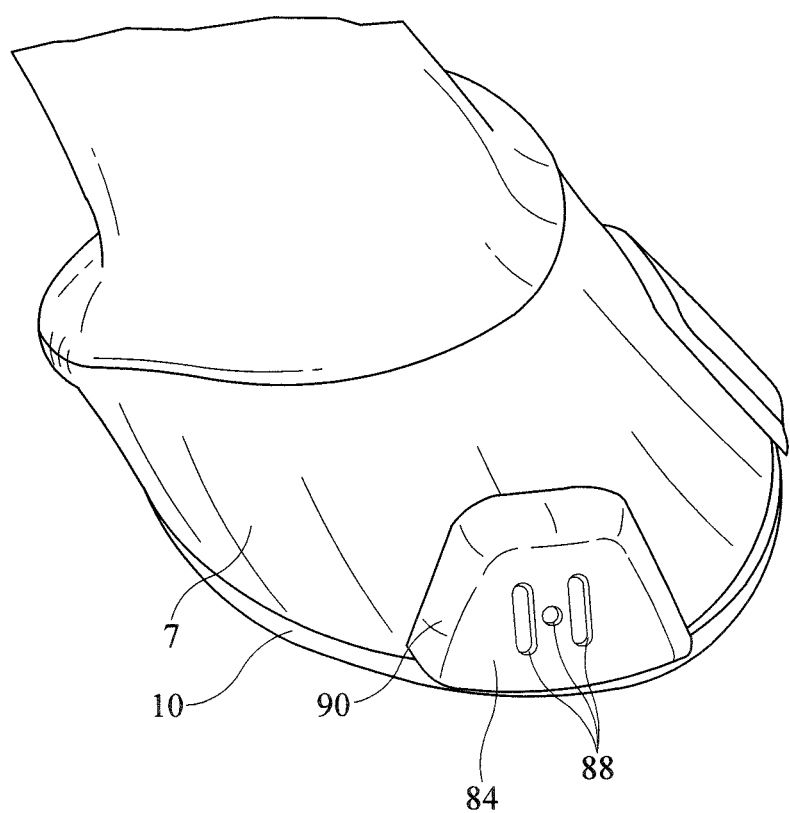
FIG. 37 shows the horseshoe of the instant invention where the horseshoe has been adhesively affixed to the horse's hoof, with the right blister having received adhesive therein, has had its exterior portion removed; and, FIGS. 38 and 39 show respective hoof and ground perspective views of a horseshoe of the instant invention, this horseshoe and clip being made of a steel material.
Figure 38:
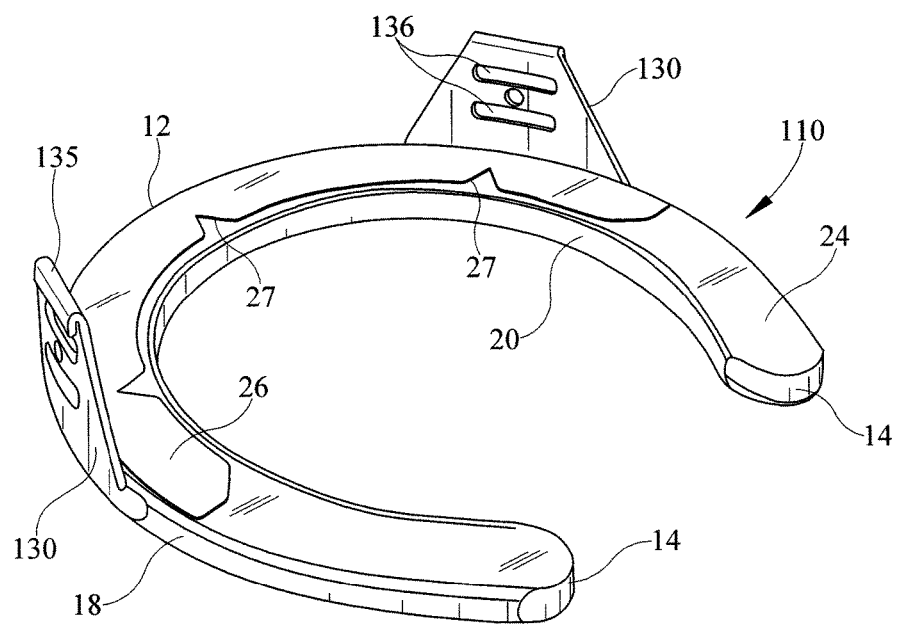
Figure 39:
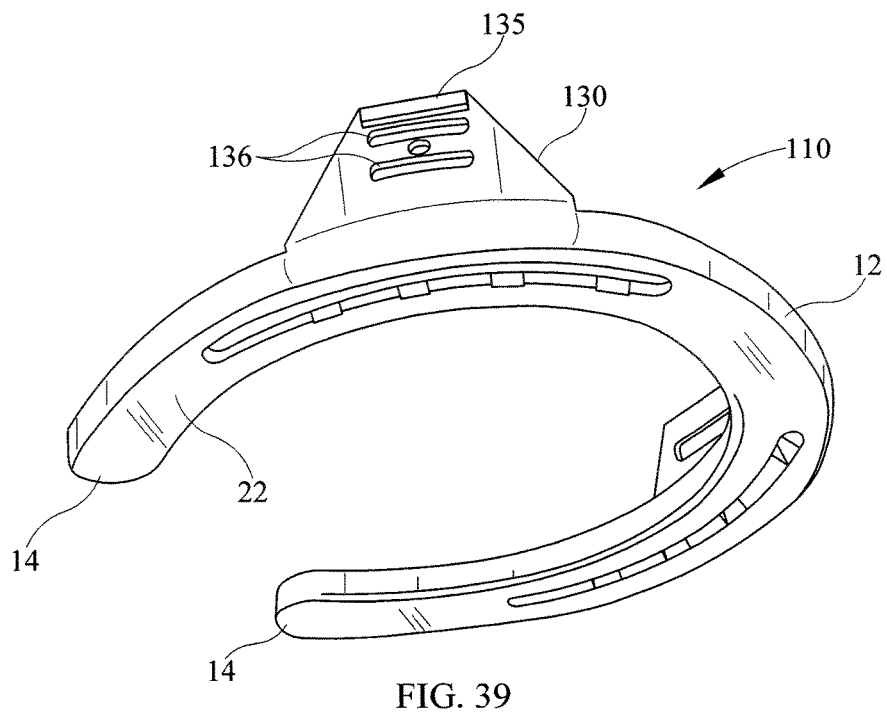

With reference to all figures, and particularly FIGS. 1, 8-11, 14-15, 18-24, and 28-37, horseshoe 10 of the instant invention is shown and with particular reference to FIGS. 38-39, horseshoe 110 is shown. Horseshoes are generally made of a metal material, but are also made of other materials as is known in the industry. However, a metal construction is preferred. Horseshoe 10 and its clips 30 are preferably of aluminum and horseshoe 110 is preferable of steel and its clips 130 are preferably of stainless steel.

As with known horseshoes, horseshoes 10 and 110 are shown with toe 12, heel 14, nail holes 16, channel to receive nail heads 17, outer side 18, inner side 20, ground surface 22, and foot surface 24. As horseshoes 10 and 110 are to be adhesively affixed to a horse's hoof 5, nail holes 16 and channel 17 are not needed and may be excluded from shoes 10 or 110. This situation might arise if affixing clips 30 or 130 to a horseshoe not made specifically for adhesively affixing to a horse's hoof.

In the figures, two implementations of clip or tab 30, 130 are shown. Clip 30 is shown having a clip bottom 32, a clip top 34, openings 36 which are openings through the clip 30, and a beveled outer edge 38. The inventor believes that this beveled outer edge 38 helps prevent separation of the clip when adhesively affixed to a horse's hoof. As shown, a pair of clips 30 are employed. These clips 30 can be made unitary with the shoe during its manufacture or may be affixed to a shoe after its manufacture. As shown, each clip 30 has its clip bottom 32 portion affixed to the outer side 18 of shoe 10 at a location between the toe 12 and a heel 14. The left and right clips 30 are preferably equally spaced from toe 12 toward the tip of each heel 14. Clips 130 are similar except that, instead of beveled outer edge 38, there is a rolled clip top 135. Clip openings 136 are like clip openings 36, in that they are all parallel to a plane in which foot surface 24 lies. The inventor believes that these openings assist with adhesively securing the shoe to the hoof as adhesive therein adheres to the hoof. Also, should the shoe separate from the hoof, the openings should assist in collapsing the clip to minimize chance of injury. Also, for example, for a clip made of steel instead of aluminum, the rolled clip top 135 also should assist in minimizing injury if the shoe separates from the hoof. While not shown, a combination with a rolled clip top and beveled clip side outer edges is within the scope of this invention and may be desired depending on the materials of construction.

The clips 30 or 130, along with a pair of blisters 50, 150, or 250, and adhesive 90 are the main attachment of the shoe 10 to the hoof 5. However, until that process is completed, for ease of attaching, two-sided tape 26 is attached to at least a portion of the foot surface 24 of shoe 10, tape 26 initially having a backer material 28 thereon. While not necessary, two-sided tape 26 is shown having notches 27 therein. Notches 27 make it easier to use the tape 26 with different sized horseshoes as they permit the tape to be used in a "tighter arc" or a "looser arc" depending on the size of the shoe. As the two-sided tape 26 will be between the bottom 6 of hoof 5 and the foot surface 24 of shoe 10, it is preferable that the tape 26 have enough thickness to not have issues with a hoof bottom 6 which may not be totally flat and not have issues with being so thick that it causes the shoe 10 to want to move. As such, the inventor believes that a tape between 10 and 15 mils (0.010 inch to 0.015 inch or 0.254 mm to 0.381 mm) thick is a preferable thickness, although different thicknesses may be used.

With reference to all figures, and particularly FIGS. 2-4, 13-15, and 25-37, the implementations of blister 50, or 150, or 250 are shown. While different thicknesses of material can be used for blister 50, 150, or 250, the inventor's preference is material having a thickness of 10 to 20 mils (0.010 inch or 0.254 mm to 0.020 inch or 0.508 mm), and most preferably about 15 mil (0.015 inch or 0.381 mm).

Blister 50 is shown with an outer edge 52 having bottom outer edge 54, top outer edge 58, and a pair of side outer edges 60. Bottom outer edge 54 has preferably a plurality of air escape vents 56 therein, vents 56 useful when adhesive 90 is being inserted into adhesive receiving opening 86. Blister 50 is shown having slits 62 between the top outer edge 58 and each side outer edge 60 and between the bottom outer edge 54 and each side outer edge 60. While shown as slits, lines of perforations or other similar cuts can be used. These slits 62 are optional, but assist the farrier when he is affixing the blister to the hoof wall 7.

Blister 50 also has a front surface connecting to an outward sloping surface 66 which connects to outer edge 52. Blister 50 includes an outer surface 68 and an inner surface 70. Inner surface has a bottom inner surface 72 to engage the shoe 10 and an upper inner surface 74 to engage the hoof wall 7. The outer edge 52 on its inner surface portion 70 has a two-sided tape 76 thereon. Tape 76 preferably includes a backer material 78 thereon. Near where front surface 64 and outward sloping surface 66 meet, there is a line of perforations 80. Slits or other similar tear means can be employed instead of line of perforations 80. Blister 50 includes a portion exterior of the perfs 82 and a portion interior of the perfs 84. Blister 50 also includes an adhesive receiving opening 86 preferably located on front surface 64 toward its top where it meets the outer sloping surface 66, or the opening may be even further toward the top outer edge 58 on the outer sloping surface 66. Some of the figures show applicant's trade dress/trademark 88, which is not part of the instant invention. As is explained later, when a blister 50 is attached to shoe 10 and hoof wall 7, a pocket is created which is to receive an adhesive 90 therein by using an adhesive applicator 4 and inserting adhesive 90 into opening 86 until the pocket is full of adhesive 90.

Figure 5:
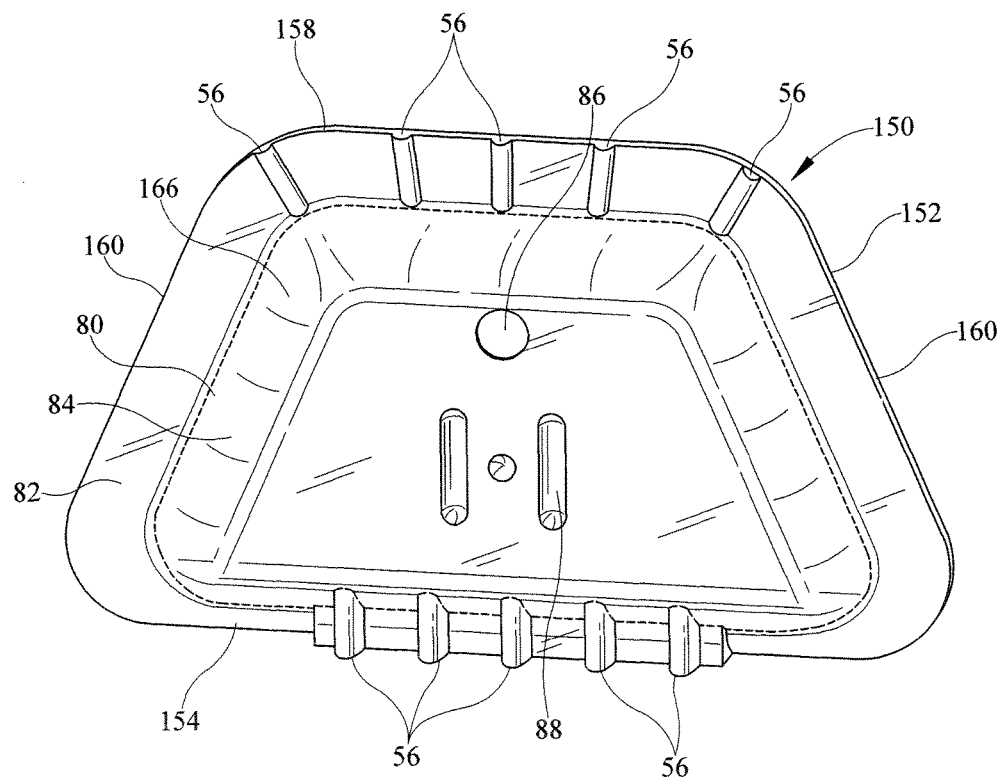
FIG. 5 shows a perspective view of the blister second implementation of the instant invention looking toward its outer surface.
Figure 6:
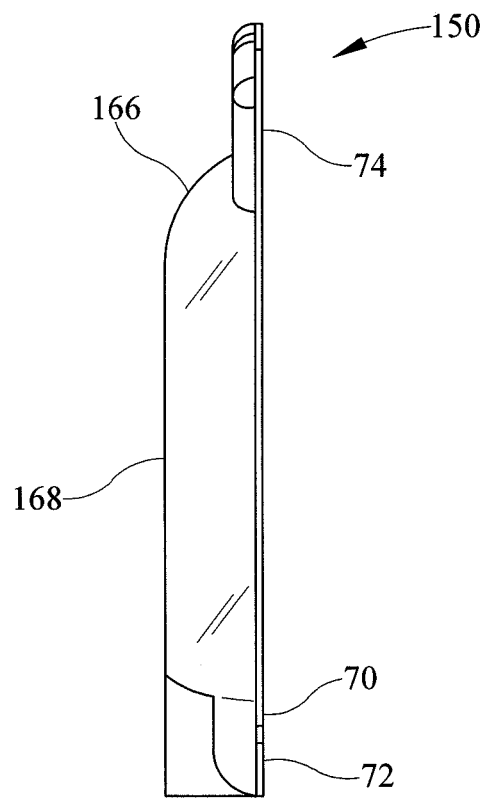
FIG. 6 shows a right side view of the blister of FIG. 5.
Figure 7:
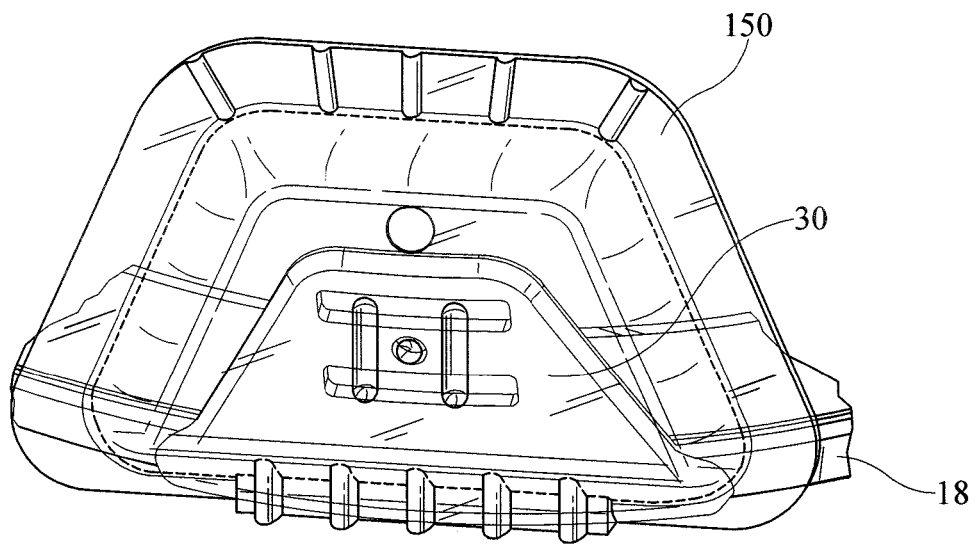
FIG. 7 shows the blister of FIGS. 5 and 6 in preparation of its application to the outer side of the horseshoe of FIG. 1.
Figure 8:
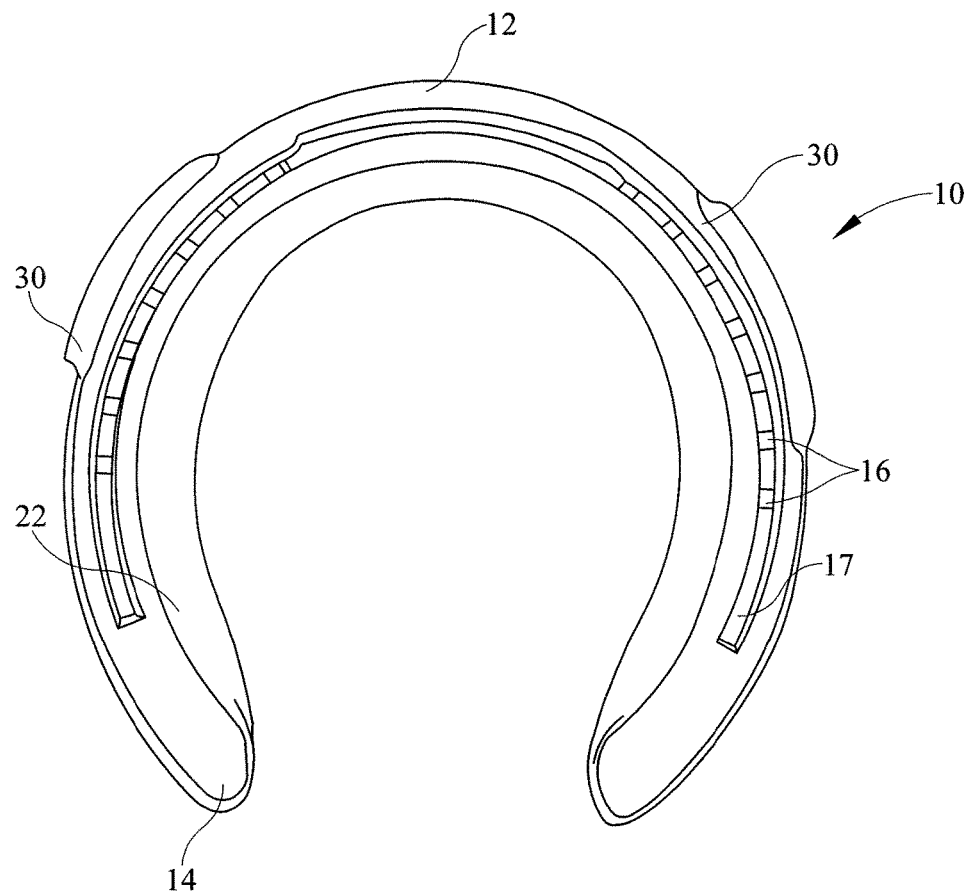
FIG. 8 shows the horseshoe with two clips of the instant invention looking at the ground surface of the shoe.
Figure 9:
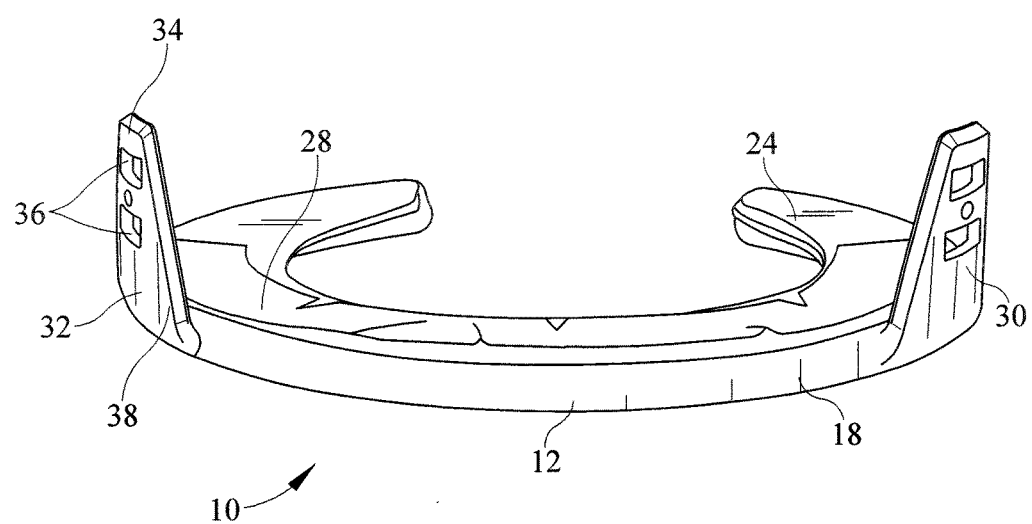
FIG. 9 shows the horseshoe of the instant invention in perspective looking at the toe and foot surface of the shoe.
Figure 10:
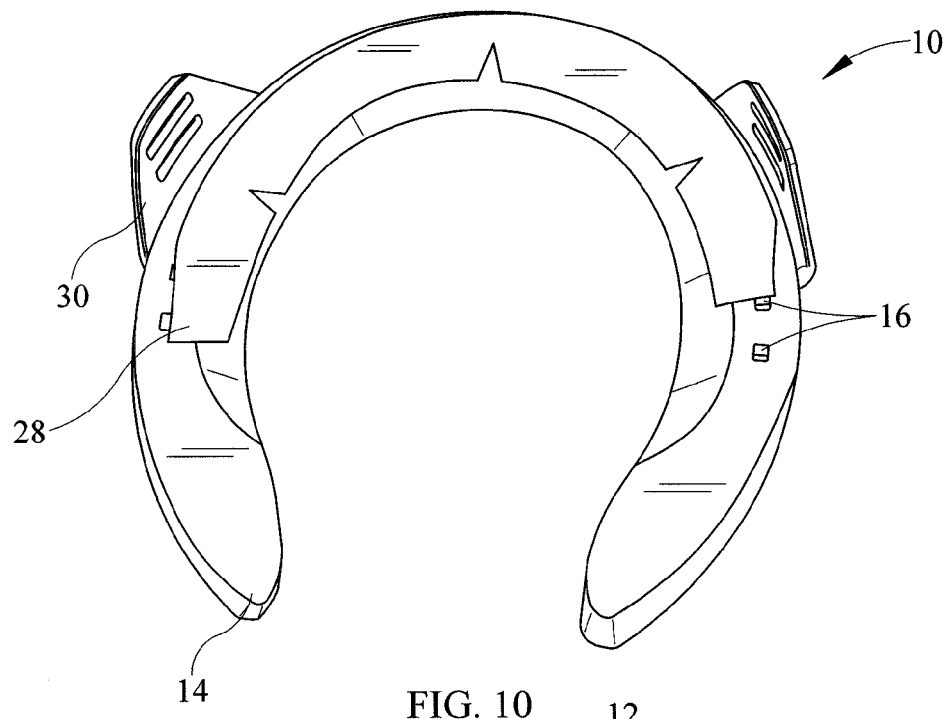
FIG. 10 shows the horseshoe of the instant invention in perspective looking at the heel and foot surface of the shoe.
Figure 11:
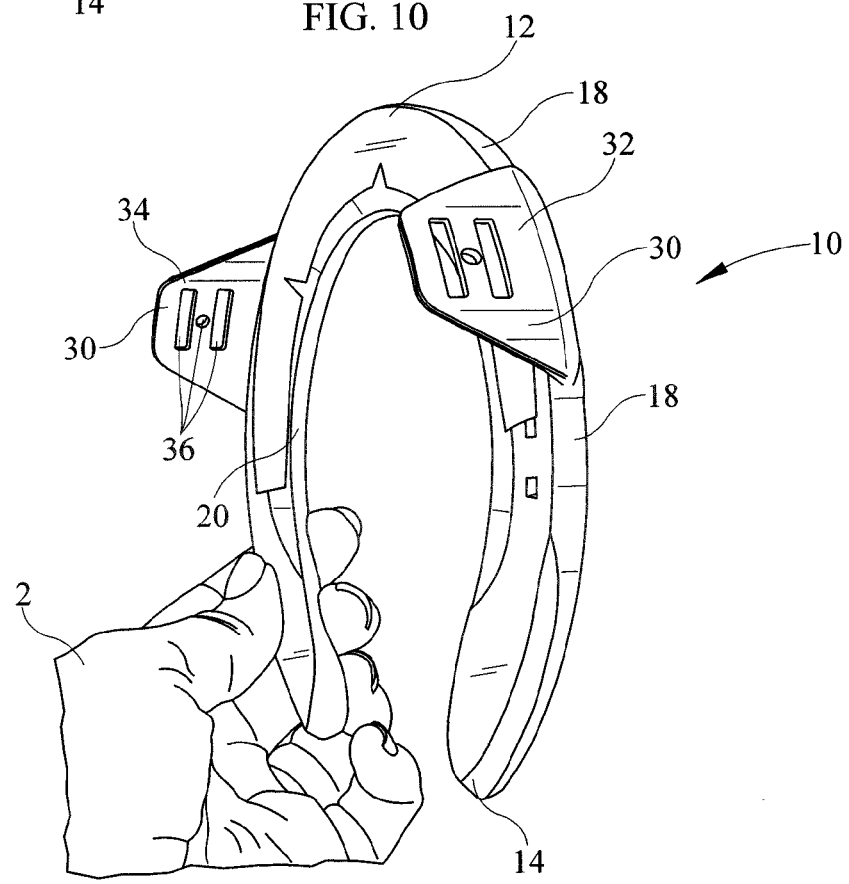
FIG. 11 shows the horseshoe of the instant invention in perspective looking at the foot surface from an outer side of the shoe.
Figure 15:
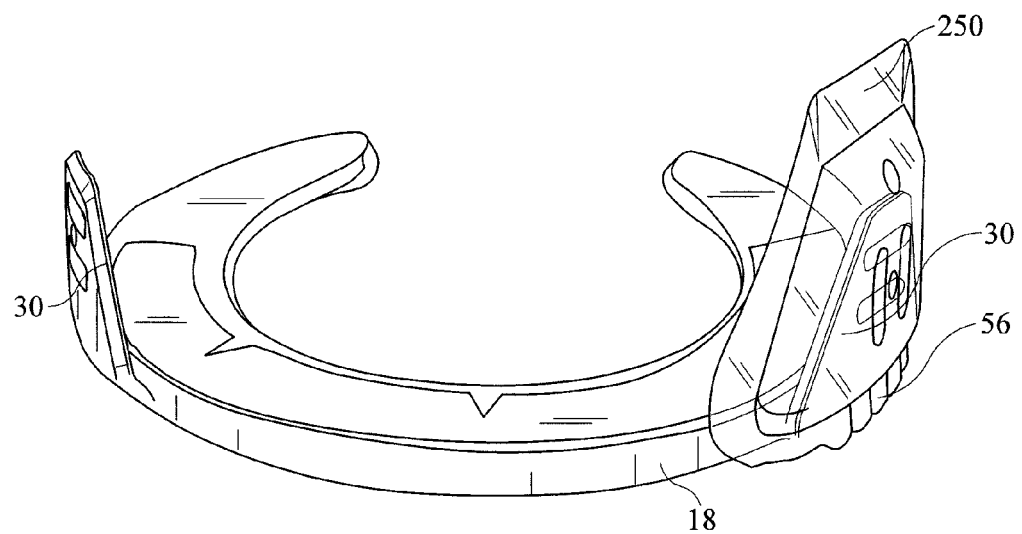
FIG. 15 shows a perspective view of the horseshoe and blister of FIG. 14 from the toe of the shoe.

The second implementation of blister 150 is similar to blister 50. However, blister 150 does not include slits 62 and includes air escape vents 56 along bottom outer edge 154 and well as along top outer edge 158. See, in particular FIG. 5.

The third implementation of blister 250 is similar to blisters 50 and 150 of the first two implementations. Blister 250 does not include air escape vents 56 and only includes air escape vents 56 along bottom outer edge 54.

FIGS. 16-37 show the process of adhesively affixing a horseshoe with clips to hoof 5. FIGS. 1-15 and FIGS. 38-39 also show other relationships and should be referred to in addition to FIGS. 16-37. As to horseshoe 10, 110, clips 30, 130, and blister 50, 150, 250, as FIGS. 16-37 are teaching the method of applying the shoe, these figures do not necessarily show the detail of the other figures.

Figure 16:
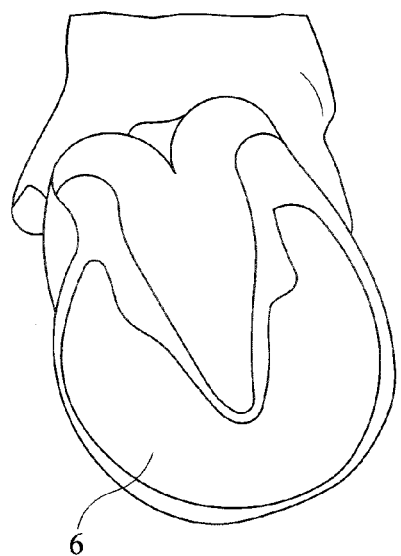
FIG. 16 shows the bottom of a horse's hoof prepared to receive a shoe.
Figure 17:
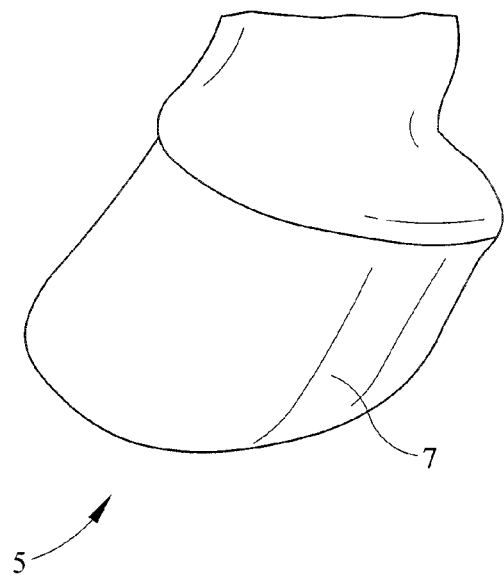
FIG. 17 shows a hoof side wall prepared to receive a shoe.

FIG. 16 shows the bottom 6 of a horse's hoof having been prepared by a farrier to receive a shoe. FIG. 17 shows the hoof wall 7 of hoof 5 having been prepared by a farrier to receive a shoe. Preferably, both the hoof 5 and the shoe to be adhesively affixed have been shaped, cleaned with a wire brush, and dried.

Figure 18:
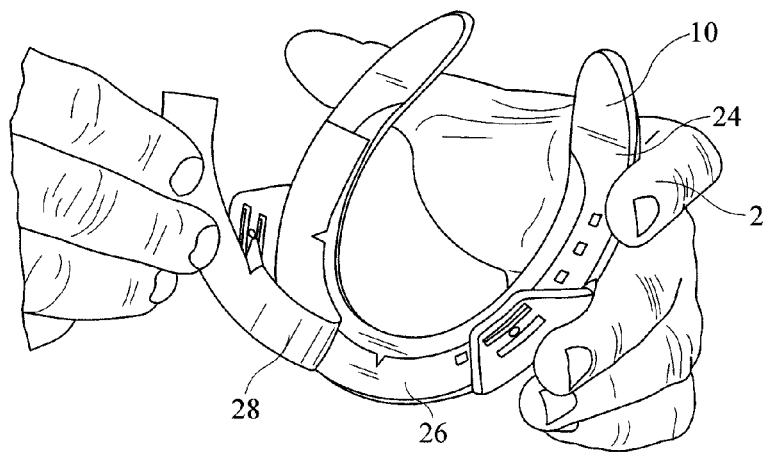
FIG. 18 shows the horseshoe of the instant invention with the farrier removing the backer material from the two-sided tape on the foot surface of the shoe.
Figures 19, 20:
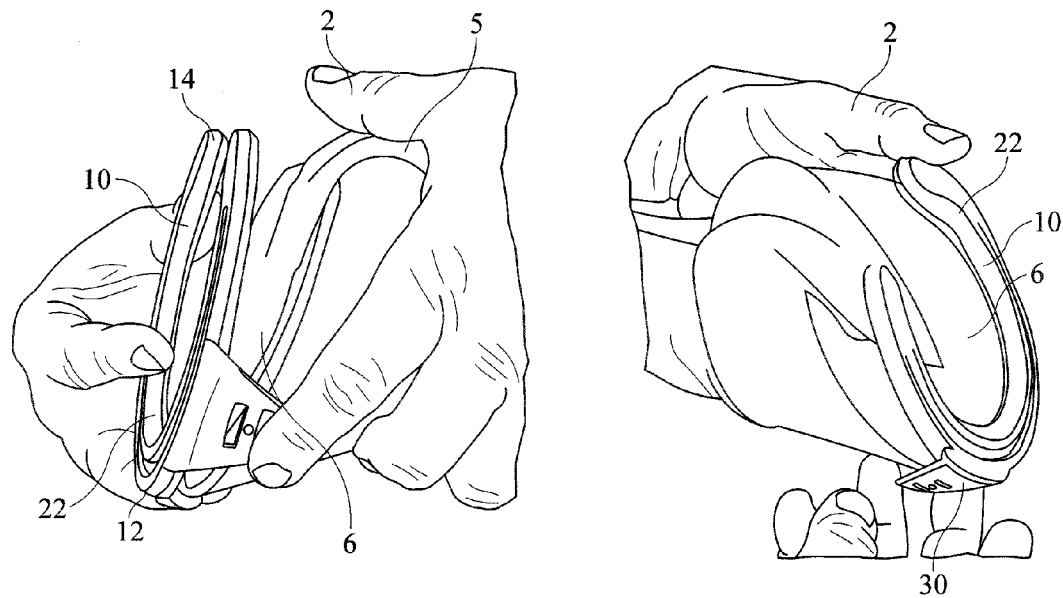
FIG. 19 shows the horseshoe of the instant invention having the backer material from the two-sided tape on the foot surface of the shoe completely removed and the foot surface of the shoe being attached to the horse's hoof.
FIG. 20 shows the application of the horseshoe to the hoof as in FIG. 19 but from a different viewpoint.
Figure 21:
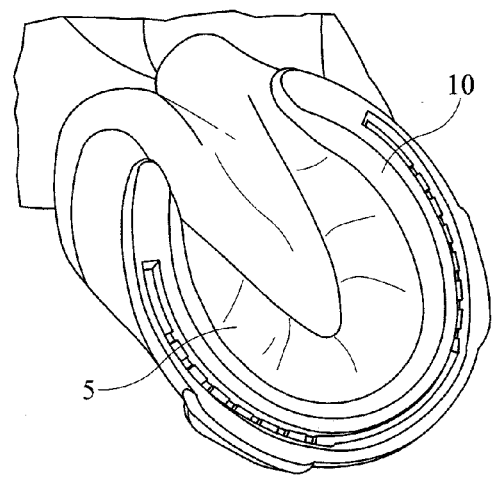
FIG. 21 shows the horseshoe adhesively attached to the horse's hoof using the two-sided tape.

FIG. 18 shows the farrier 2 removing the backer 28 to expose the two-sided tape 26. The backer 28 is fully removed. FIGS. 19 and 20 show the farrier 2 affixing the foot surface of shoe to the bottom 6 of hoof 5 such that the two-sided tape 26 holds the shoe 10 to the bottom 6. FIG. 21 shows the shoe 10 being held onto hoof 5 by the tape.

Figures 22, 23:
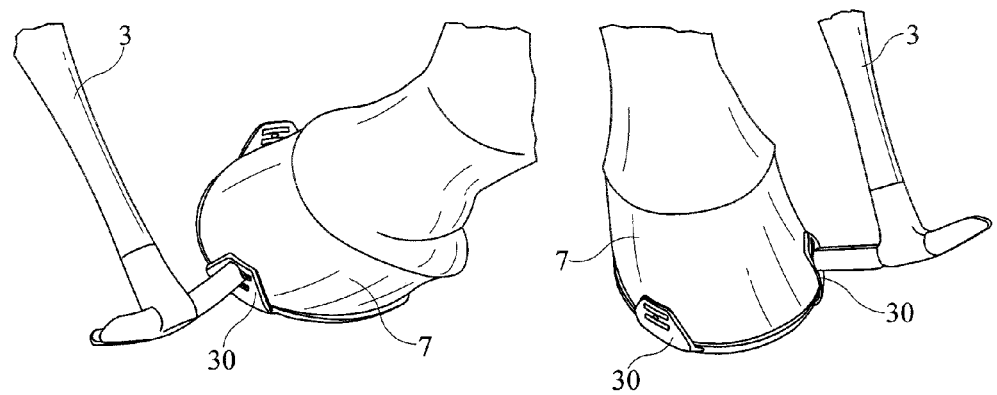
FIGS. 22 and 23 show the farrier using a tool to move the clips inward toward the prepared hoof wall.
Figure 24:
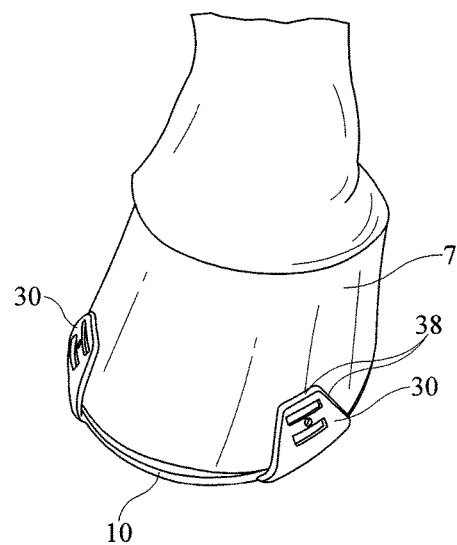
FIG. 24 shows a perspective view of the horseshoe of the instant invention affixed to the bottom of the horses hoof with the clips moved toward the prepared hoof wall.

In FIGS. 22 and 23, the farrier has placed the horse's leg onto the ground so that the horse is standing on shoe 10. Next, the farrier 2 uses tool 3, such as a hammer, to adjust the clips 30 inward so that they abut or are flush with the hoof wall 7. FIG. 24 shows the horse's hoof wall 7 with the horse standing on shoe 10 with the clips 30 moved inward to be flush with wall 7. One can also see beveled outer edge 38.

Figure 25:
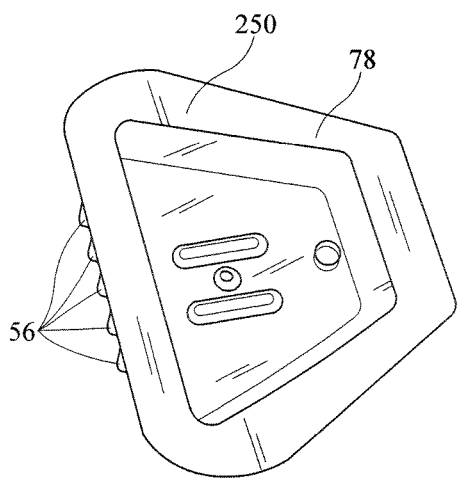
FIG. 25 shows a perspective view of a blister with two-sided tape having a backer material thereon.
Figure 26:
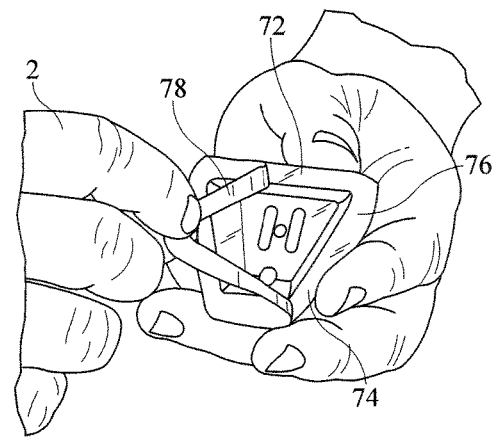
FIG. 26 shows the farrier removing the backer material from the two-sided tape on the blister of FIG. 25.
Figure 27:
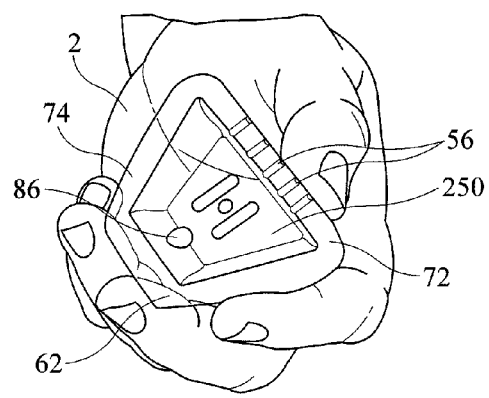
FIG. 27 shows the blister of FIG. 25 with the backer material completely removed from the two-sided tape.
Figure 28:
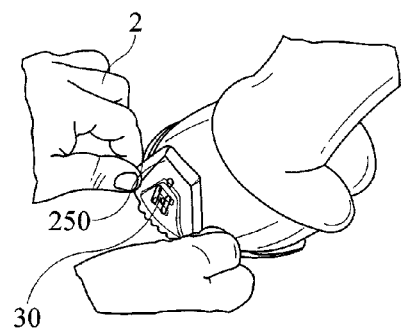
FIG. 28 shows the farrier affixing the bottom of the blister to the outer side of the shoe, in the same orientation as shown in FIG. 14.
Figure 29:
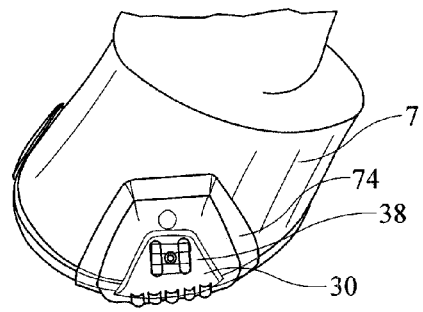
FIG. 29 shows the blister having its bottom edge affixed to the outer edge of the shoe and its other edges affixed to the prepared hoof wall.
Figure 30:
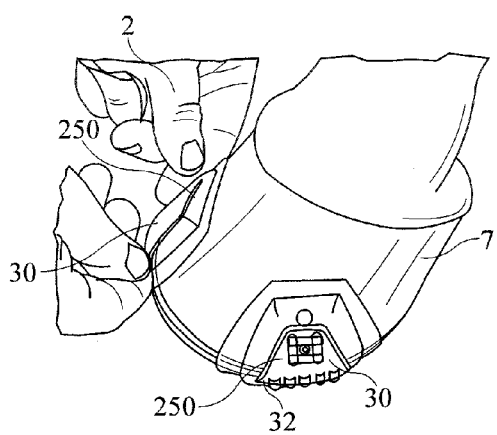
FIG. 30 shows the farrier affixing the other blister to the shoe outer wall and prepared hoof wall the farrier did in FIGS. 28 and 29.
Figure 31:
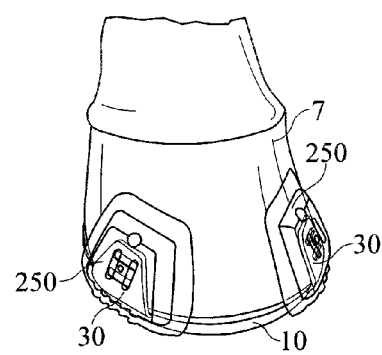
FIG. 31 shows the horse's hoof with the shoe adhesively attached to the bottom of the hoof and the pair of blisters affixed to the shoe and hoof wall as shown in FIGS. 28-30.

FIG. 25 shows blister 250 with backer 78 covering tape 76. In FIG. 26, the farrier 2 is removing the backer 78 to expose the two-sided tape 76. FIG. 26 also shows the bottom inner surface 72 which will engage the shoe 10 and the upper inner surface 74 which will engage the hoof wall 7. FIG. 27 shows the farrier 2 having fully removed the backer 78.

FIGS. 28-31 show the farrier 2 affixing the two blisters 250 such that the bottom inner surface 72 is affixed to the outer side 18 of shoe 10 and the upper inner surface 74 is affixed to the hoof wall 7. Blisters 250 have been affixed (also see FIG. 14) so that each blister 50 has a clip 30 therebehind.

Figure 32:
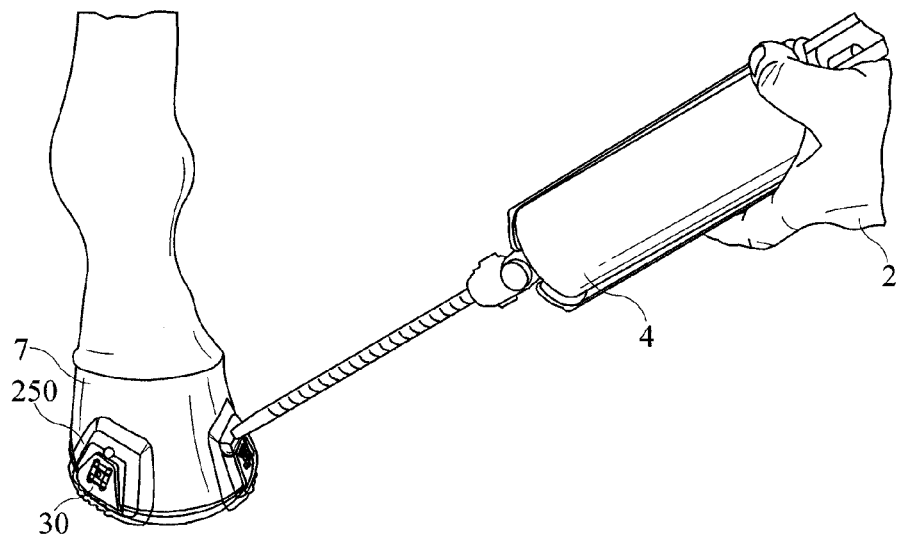
FIGS. 32 and 33 show the farrier inserting adhesive into the adhesive insertion opening of a blister.
Figure 33:
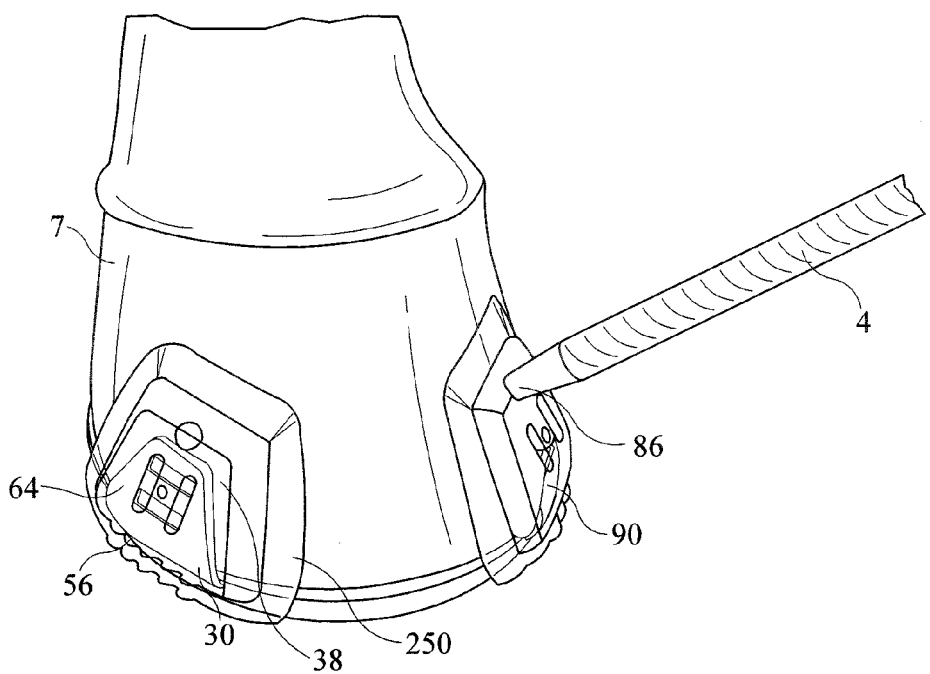
Figure 34:
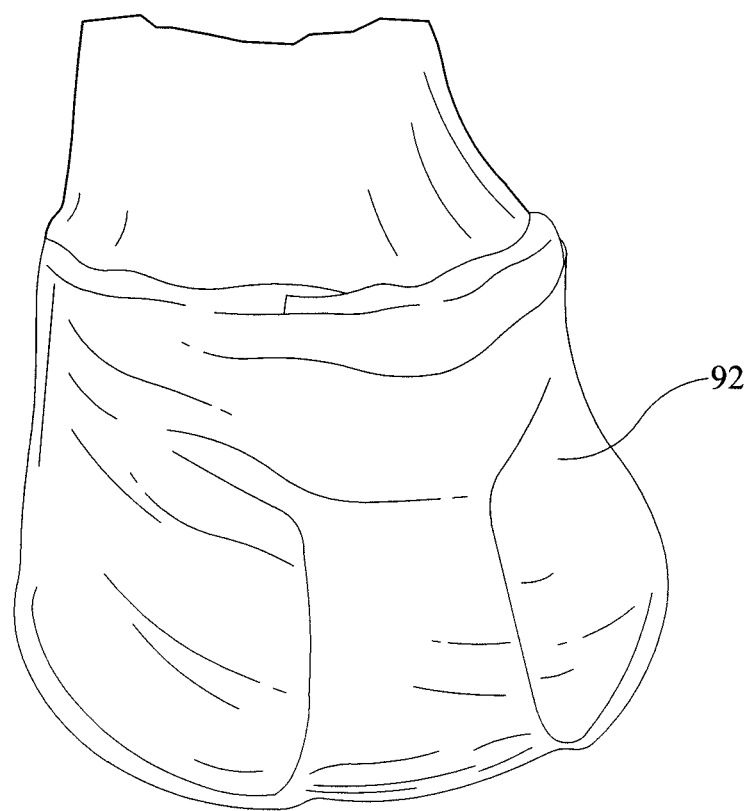
FIG. 34 shows a wrap placed around the horse's hoof to provide stability during the adhesive cure time period.

In FIGS. 32 and 33, the farrier 2 is using an adhesive applicator 4 to insert adhesive 90 into opening 86. As the adhesive 90 is being inserted, air escape vents 56 permit the space between the front surface 64 of blister 50 and the hoof wall 7 to fully fill with adhesive. While various adhesives can be used, the inventor prefers Hoof-Life Shoe Adhesive made by The Victory Racing Plate Company of Baltimore, Md. This adhesive 90 is a two-part epoxy. The openings 36 through clip 30 allow more of the adhesive to engage the hoof wall 7. Also, with the beveled outer edge 38, if there is any movement of the clip 30 separate from any movement of the hoof wall 7, the inventor believes that this beveled edge 38 will help the shoe 10 not separate from the hoof 5.

Once the adhesive 90 has been inserted fully into each opening 86 of the pair of blisters 250, the hoof area and shoe area is wrapped in a wrap 92, such as a plastic or stretch wrap, and the hoof is placed on the ground to minimize any movement while the adhesive is curing.

Figure 35:
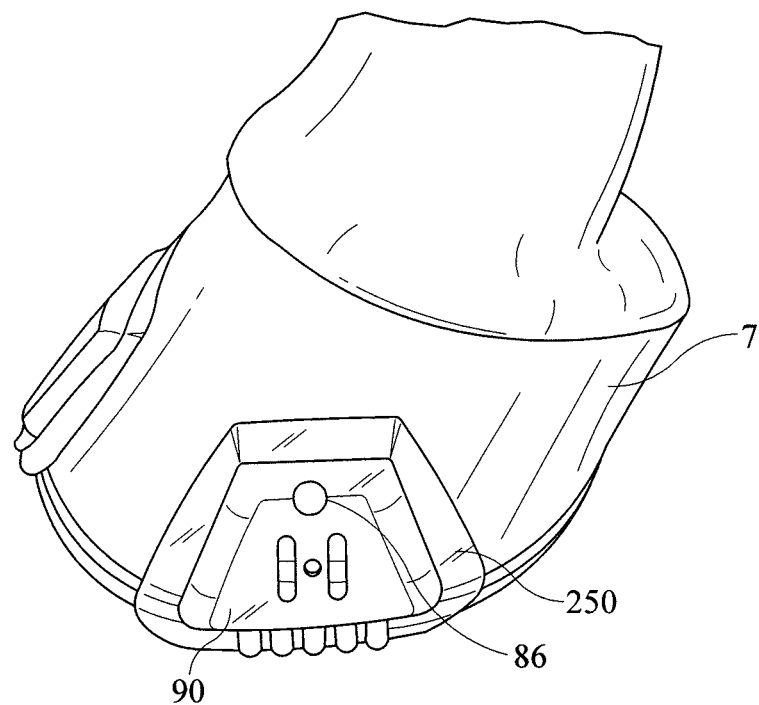
FIG. 35 shows one of the blisters after insertion of the adhesive into the adhesive insertion opening and the adhesive is cured and the wrap removed.

FIG. 35 shows the hoof wall 7 after adhesive 90 has been fully inserted into opening 86 and allowed to cure and the wrap 92 removed. With the preferred adhesive 90, the adhesive is sufficiently cured in 5-10 minutes for the farrier to proceed.

Figure 36:
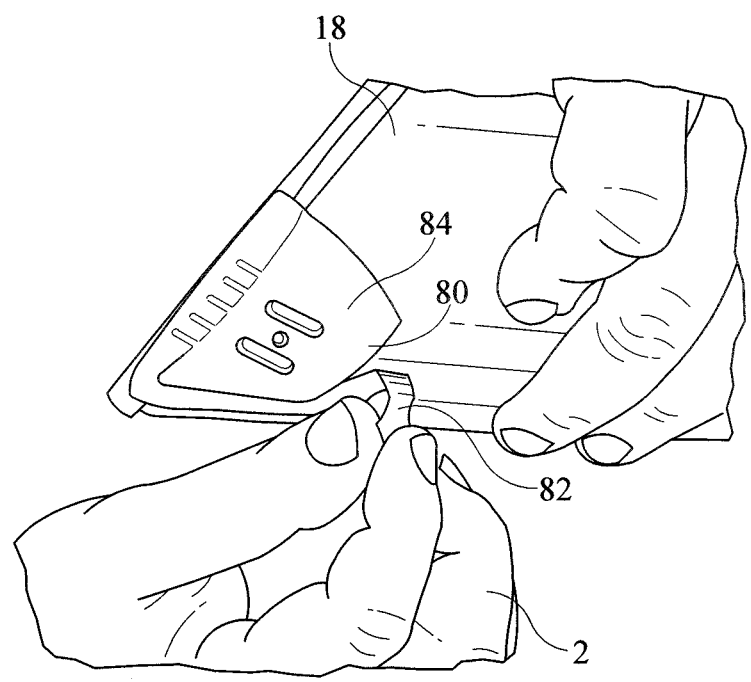
FIG. 36 shows the farrier removing the outer portion of the blister using the line of perforations around the blister.

In FIG. 36, the farrier 2 is using perf line 80 to remove the portion exterior of the perfs 82 and leave the portion interior of the perfs 84. The inventor believes that leaving this portion 84 and only removing portion 82 provides added reinforcement. FIG. 37 shows that the farrier has completed removal of portion 82 on the right side of the hoof. When the farrier completes the same process on the left side of the hoof, the shoe 10 is adhesively affixed to the horse's hoof 5.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A horseshoe, comprising: a curved shoe having a heel at each end and a toe therebetween, the shoe having a ground surface and a foot surface opposite the ground surface, the shoe having an outer side thereround and an inner side; a first clip and a second clip, said clips having a clip bottom and a clip top, the first clip attached to the shoe along the shoe outer side and the clip bottom, the attachment between the toe and one heel, the clip top oriented upward and away from the ground surface; the second clip attached to the shoe along the shoe outer side and the clip bottom, the attachment between the toe and the other heel, the clip top oriented upward and away from the ground surface; the first clip and the second clip having at least one opening therethrough, the at least one opening being aligned parallel to the shoe ground surface; and, where each of the first clip and second clip have a blister member at least partially thereover, each blister member for use in adhering the horseshoe to a horse's hoof, each blister member having an outer surface and an inner surface; an outer edge with a top outer edge and a bottom outer edge with a pair of side outer edges therebetween; the outer edge having at least one air escape vent; and, a generally trapezoidal shaped perforation line interior of the outer edge, a portion interior of the perforation line raised with respect to a portion exterior of the perforation line; the portion interior of the perforation line having an adhesive receiving opening between the outer surface and the inner surface; the bottom outer edge of each blister member attached along the shoe outer side along the clip bottom and each side thereof, the blister top outer edge extending upward beyond the clip top.

2. The horseshoe of claim 1, where the first clip and the second clip each include a beveled outer edge along the clip top and extending toward the clip bottom.

3. The horseshoe of claim 1, where the first clip and the second clip each have a rolled portion along the clip top.

4. The horseshoe of claim 1, where the at least one opening in the first clip and second clip comprises at least two openings, each of the at least two openings being aligned parallel to the shoe ground surface.

5. The horseshoe of claim 1, where each blister member has one of its at least one air escape vent located at the bottom outer edge.

6. The horseshoe of claim 1, where each blister member has one of its at least one air escape vent comprises at least two air escape vents, one of the at least two air escape vents located at the bottom outer edge and another of the at least two air escape vents located at the top outer edge.

7. The horseshoe of claim 1, where each blister member has its adhesive receiving opening located toward the top outer edge with respect to the bottom outer edge.

8. The horseshoe of claim 1, where each blister member has a two-sided tape attached along the outer edge of the blister member inner surface, the two-sided tape utilized to attach each blister member along the shoe outer side.

9. A method of applying a horseshoe to a horse's hoof, the method comprising the steps of:
  a. taking a horseshoe being a curved shoe having a heel at each end and a toe therebetween, the shoe having a ground surface and a foot surface opposite the ground surface, the shoe having an outer side thereround and an inner side; a first clip and a second clip, said clips having a clip bottom and a clip top, the first clip attached to the shoe along the shoe outer side and the clip bottom, the attachment between the toe and one heel, the clip top oriented upward and away from the ground surface; the second clip attached to the shoe along the shoe outer side and the clip bottom, the attachment between the toe and the other heel, the clip top oriented upward and away from the ground surface; the first clip and the second clip having at least one opening therethrough, the at least one opening being aligned parallel to the shoe ground surface; and placing the foot surface of the horseshoe against the horse's hoof;
  b. adjusting the first and second clip so that they are flush with a wall of the horse's hoof;
  c. attaching a first blister member over the first clip and a second blister member over the second clip, each of the first and second blister members having an outer surface and an inner surface; an outer edge with a top outer edge and a bottom outer edge with a pair of side outer edges therebetween; the outer edge having at least one air escape vent; and, a generally trapezoidal shaped perforation line interior of the outer edge, a portion interior of the perforation line raised with respect to a portion exterior of the perforation line and away from the wall of the horse's hoof; the portion interior of the perforation line having an adhesive receiving opening between the outer surface and the inner surface; the bottom outer edge of each blister member attached along the shoe outer side along the clip bottom and each side thereof, the blister top outer edge extending upward beyond the clip top with each blister having its side outer edges and top outer edge attached to the wall of the horse's hoof; and,
  d. inserting adhesive into the adhesive receiving opening of each blister and allowing the inserted adhesive to cure.

10. In the method of applying a horseshoe to a horse's hoof of claim 9, after the step of inserting adhesive and allowing it to cure, the method comprising the additional step of removing the portion exterior of the perforation line from the first and second blister members.

11. In the method of applying a horseshoe to a horse's hoof of claim 9 and the step of taking a horseshoe and placing the foot surface of the horseshoe against the horse's hoof, a two-sided tape is used between the horseshoe's foot surface and the horse's hoof.

12. In the method of applying a horseshoe to a horse's hoof of claim 11, after the step of inserting adhesive and allowing it to cure, the method comprising the additional step of removing the portion exterior of the perforation line from the first and second blister members.

* * * * *